United States Patent
Burkholder et al.

(10) Patent No.: US 9,482,826 B2
(45) Date of Patent: Nov. 1, 2016

(54) CONNECTOR BODY FOR MAKING CRIMP-LESS FIBER OPTIC CABLE CONNECTIONS

(71) Applicant: Tyco Electronics Corporation, Berwyn, PA (US)

(72) Inventors: Matthew Lynn Burkholder, Lititz, PA (US); Michael Francis Bruce, Steelton, PA (US); Jose Luis Ibero, Mount Joy, PA (US)

(73) Assignee: CommScope Technologies LLC, Hickory, NC (US)

( * ) Notice: Subject to any disclaimer, the term of this patent is extended or adjusted under 35 U.S.C. 154(b) by 702 days.

(21) Appl. No.: 13/837,963

(22) Filed: Mar. 15, 2013

(65) Prior Publication Data

US 2015/0268423 A1    Sep. 24, 2015

(51) Int. Cl.
*G02B 6/36* (2006.01)
*G02B 6/38* (2006.01)

(52) U.S. Cl.
CPC ............ *G02B 6/3887* (2013.01); *G02B 6/387* (2013.01); *G02B 6/3858* (2013.01); *G02B 6/3881* (2013.01); *Y10T 29/4995* (2015.01)

(58) Field of Classification Search
CPC ...................................... G02B 6/387
See application file for complete search history.

(56) References Cited

U.S. PATENT DOCUMENTS

| | | | |
|---|---|---|---|
| 4,186,997 A * | 2/1980 | Schumacher | G02B 6/3809 385/65 |
| 7,892,045 B2 | 2/2011 | Ratzlaff et al. | |
| 2002/0141724 A1* | 10/2002 | Ogawa | G02B 6/4472 385/137 |
| 2005/0053342 A1 | 3/2005 | Melton et al. | |
| 2006/0056769 A1 | 3/2006 | Khemakhem et al. | |
| 2008/0025670 A1 | 1/2008 | Castagna et al. | |
| 2008/0240658 A1 | 10/2008 | Leeman et al. | |
| 2010/0080515 A1 | 4/2010 | Hopkins et al. | |
| 2010/0092147 A1* | 4/2010 | Desard | G02B 6/4477 385/135 |
| 2010/0254663 A1 | 10/2010 | Hopkins et al. | |
| 2012/0301085 A1 | 11/2012 | Grinderslev | |

FOREIGN PATENT DOCUMENTS

DE    203 03 870 U1    8/2004

OTHER PUBLICATIONS

International Search Report and Written Opinion for PCT/US2014/027842 mailed Jul. 21, 2014.

* cited by examiner

*Primary Examiner* — Uyen Chau N Le
*Assistant Examiner* — Chad Smith
(74) *Attorney, Agent, or Firm* — Merchant & Gould

(57) ABSTRACT

A connector body includes upper and lower housings. The lower housing defines a locking structure, a cable channel and a retention channel adjacent the cable channel. The upper housing defines a complementary locking structure for interlocking the housings, and a retention projection for registering with the retention channel. The connector body may be assembled by moving the housings along a first direction into a mated position in which upper and lower housings register with one another but are not interlocked, and then moving the housings along a second direction transverse to the first direction until the locking structures interlock and the retention projection is in registration with the retention channel with the strength members pinched therebetween. A cable connector assembly includes a terminated fiber optic cable received in the connector body, with the ferrule retained between the housings and the strength members pinched between the retention projection and retention channel.

20 Claims, 7 Drawing Sheets

CONNECTOR BODY FOR MAKING CRIMP-LESS FIBER OPTIC CABLE CONNECTIONS

FIELD OF INVENTION

The present invention relates generally to optical connectors, and more particularly to a method and connector housing for making crimp-less fiber optic cable connections, particularly one that is well-suited to automated assembly and may be actuated without the need for tools.

BACKGROUND

Fiber optic connectors of various types are found in virtually all fiber optic communication systems. Optical fiber connectors are an essential part of practically all optical fiber communication systems. For instance, such connectors are used to join segments of fiber into longer lengths, to connect fiber to active devices such as radiation sources, detectors and repeaters, and to connect optical fiber to passive devices such as switches and attenuators. The principal function of an optical fiber connector is to couple optically a fiber with a mating device (e.g., another fiber, an active device or a passive device) by holding the end of the fiber such that the core of the fiber is axially aligned with an optical pathway of the mating device. Various types of optical connectors are well-known in the art. Exemplary connectors include FC, LC, MT-RJ, and MPO style connectors.

A fiber optic cable typically comprises a cable jacket containing a centrally-located buffered fiber. Frequently, the cable also comprises strength members (e.g., aramid or para-aramid synthetic fibers, such as Kevlar® fibers) surrounding the buffered fiber. The purpose of the strength members is to bear pulling forces applied to the cable, and thereby leave the buffered fiber isolated and unloaded from those forces.

An important aspect of terminating a fiber with a connector is to secure the cable to the connector. To this end, the buffered fiber is typically fixated to the ferrule, which is supported by the connector housing. Further, if the cable comprises strength members, these members are captivated by the connector at certain points such that any load on the cable is transferred to the captivation points only and not to the fragile fiber strand. Typically, the cable strength members are crimped onto the back end of the connector housing. To do this, a crimp tool is used to crimp an eyelet over the strength members (and sometimes the cable jacket), thereby captivating the strength members (and in some cases the cable jacket) between the eyelet and the back end of the connector housing. The eyelet is usually crimped with sufficient force to form the eyelet around the backend of the connector housing.

Applicant has identified a number of potential shortcomings with the use of crimp eyelets. First, a traditional crimp eyelet requires a crimping tool to crimp it on to the backend of the housing. The need for tools naturally involves an additional cost associated with acquiring the tools and replacement of the tools, as loss happens frequently in the field. Aside from requiring a tool, this termination approach also tends to be cumbersome as the user must arrange the strength members over the backend of the housing and then hold the cable and connector in a precise position while crimping the eyelet. The cumbersome nature of this procedure can lead to error in the eyelet crimping, resulting in variations in the integrity of the crimp and possibly damage to the fiber. Further, such crimping and connector assembly processes involve complex assembly steps and thus are typically performed manually, and are very difficult to automate.

Further still, conventional connector assembly processes require that various components of the connector be threaded onto the cable prior to termination of the fiber in a ferrule. This also complicates the assembly process and presents obstacles to automation of the connector assembly process. For example, referring now to the exemplary MPO-style connector of FIG. 1, an exemplary connector assembly process for assembling a connector 20 for an optical fiber cable 10 containing buffered fibers (not shown) involves first threading a strain relief boot 22, crimp eyelet 24, rear housing 26 and coil spring 28 onto the free end of the cable 10. Next, the end of each buffered fiber is prepared by removing the buffer from the bare fiber, and the bare fibers are secured in the ferrule, e.g., by epoxy. Termination is completed by then cleaving and polishing the fiber ends to produce a smooth low loss facet to optically couple with another fiber, using any conventional processes. The terminating fiber may or may not have a jacket.

In one embodiment, only the distal tip of the fiber is stripped down to bare fiber. More specifically, a length of terminating fiber is stripped down to the primary buffer (not shown) to form a stripped portion, and then just the distal end of the stripped portion is further stripped down to bare fiber 6. The buffered fiber (with the stripped tip) is then pushed through ferrule boot 32 and ferrule 34 and fixated by means of adhesive. The bare fiber, protruding from the ferrule is then cleaved and polished flush with the ferrule end face to produce a smooth low loss facet to optically couple with another fiber (not shown), using any conventional process.

Strength members of the cable encircle the buffered fiber, and are exposed when the outer jacket is stripped. The strength members are distributed around the rear housing 26 and the crimp eyelet 24 is passed over the strength members and the rear housing. Next, the crimp eyelet 24 is crimped, thereby securing the strength members to the rear housing 26.

After the ferrule 34 is thus prepared, the front housing 36 may be assembled onto the ferrule 34 and the rear housing 26 thus prepared to complete the assembly of the connector 20. A removable protective cap 38 may cover the distal end of the front housing 36. The optical performance of the connector may then be tested to ensure the optical performance is acceptable.

Therefore, there is a need for an improved approach for securing a fiber optic cable to a connector that does not require a crimp eyelet and a corresponding manual crimping and/or manual assembly process. Further, Applicant has identified a need for a connector body that allows for assembly of a connector body after termination of the fiber, and thus is better suited to automated termination of the fiber, and automated assembly of the connector body. Further still, Applicant has identified a need for a crimp-less cable connection that avoids the need to thread any connector components onto the cable prior to termination of the fiber to a ferrule, and allows for crimp-less connector assembly that secures the strength members of the cable. The present invention fulfills these needs among others.

SUMMARY OF INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

One aspect of the present invention provides a connector body for making crimp-less connections for a fiber optic cable comprising strength members. The connector body includes a lower housing and an upper housing. The lower housing defines a locking structure; and at least one retention channel for receiving strength members. The upper housing defines a complementary structure complementary to said locking structure of said lower housing, the complementary structure being disposed to register with the locking structure to interlock the upper housing to the lower housing when the upper and lower housings are in an interlocked position; and at least one retention projection disposed to register with the at least one retention channel when the upper and lower housings are in the interlocked position.

Another aspect of the present invention provides a cable connector assembly comprising the connector body and a fiber optic cable comprising strength members. In addition to the connector body, the assembly includes a terminated fiber optic cable comprising a jacket housing a buffered optical fiber and a plurality of strength members, the fiber optic cable comprising at least one optical fiber terminated to a ferrule. The upper and lower housings are positioned in an interlocked position in which the locking structure is interlocked with the complementary locking structure, the ferrule being supported between the upper and lower housings of the connector body, and the at least one retention projection is in registration with the at least one retention channel and is pinching the strength members therebetween.

Another aspect of the present invention provides a method for making a crimp-less connection for a fiber optic cable comprising strength members. The method comprises providing a connector body and providing a terminated fiber optic cable comprising a jacket housing a buffered optical fiber and a plurality of strength members, the fiber optic cable comprising at least one optical fiber terminated to a ferrule. The method further comprises: positioning the terminated fiber optic cable's jacket in the cable channel portion of the lower housing and the ferrule adjacent the lower housing's front end; positioning the plurality of strength members in the at least one retention channel; and moving the upper and lower housings into an interlocked position in which the locking structure is interlocked with the complementary locking structure, the ferrule is supported between the upper and lower housings of the connector body, and the at least one retention projection is in registration with the at least one retention channel with the strength members pinched therebetween.

BRIEF SUMMARY OF DRAWINGS

The present invention will now be described by way of example with reference to the following drawings in which.

DETAILED DESCRIPTION

Although the present invention could possibly be applied to a broad range of fiber optic connectors such as MT, MT-RJ, MPO, MPX, MU style connectors, the present invention is discussed below in the context of a TELLMI-style connector body for illustrative purposes.

Figure 1:
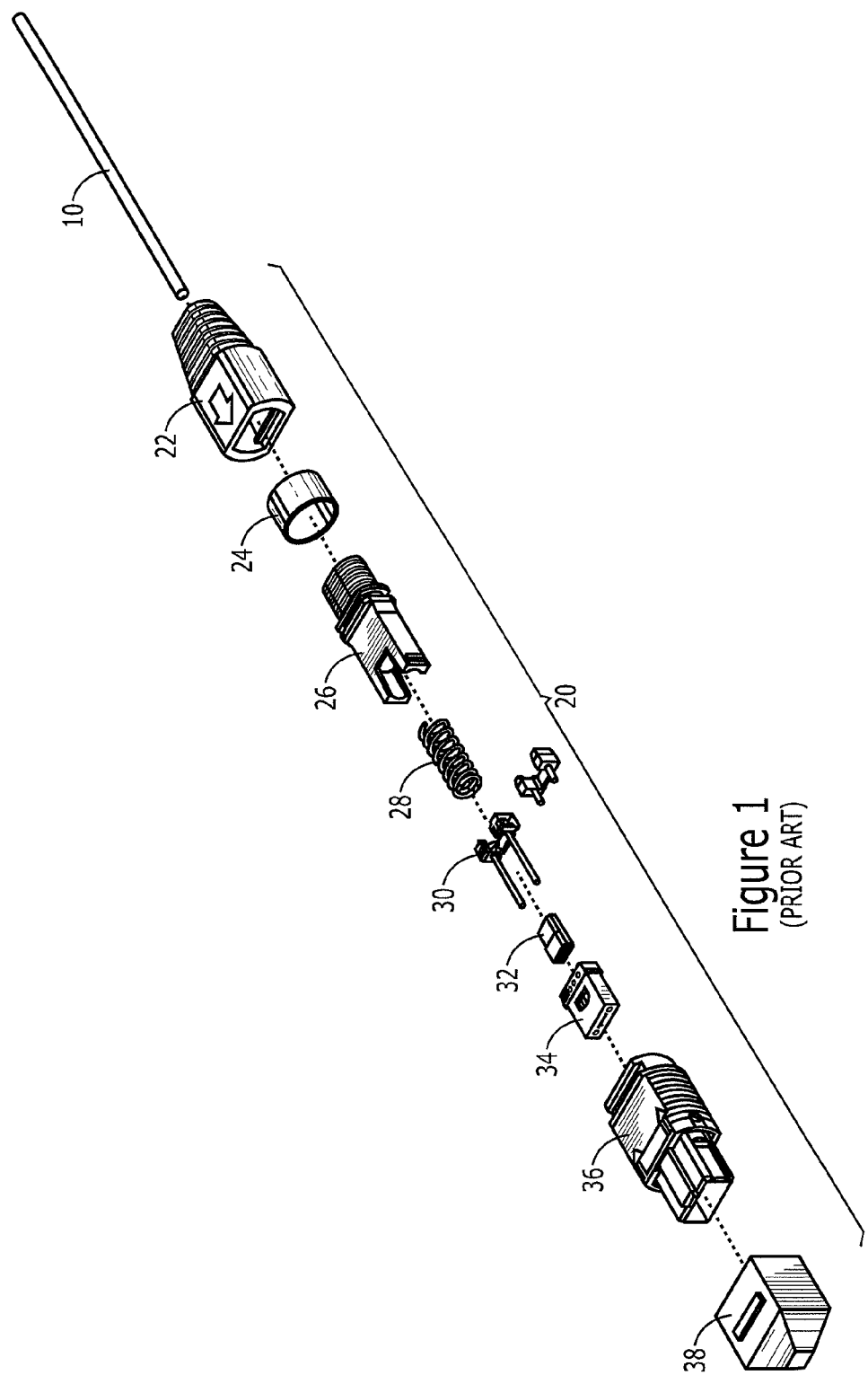
FIG. 1 is an exploded isometric view of an exemplary MPO-style connector of the prior art.
Figure 2:
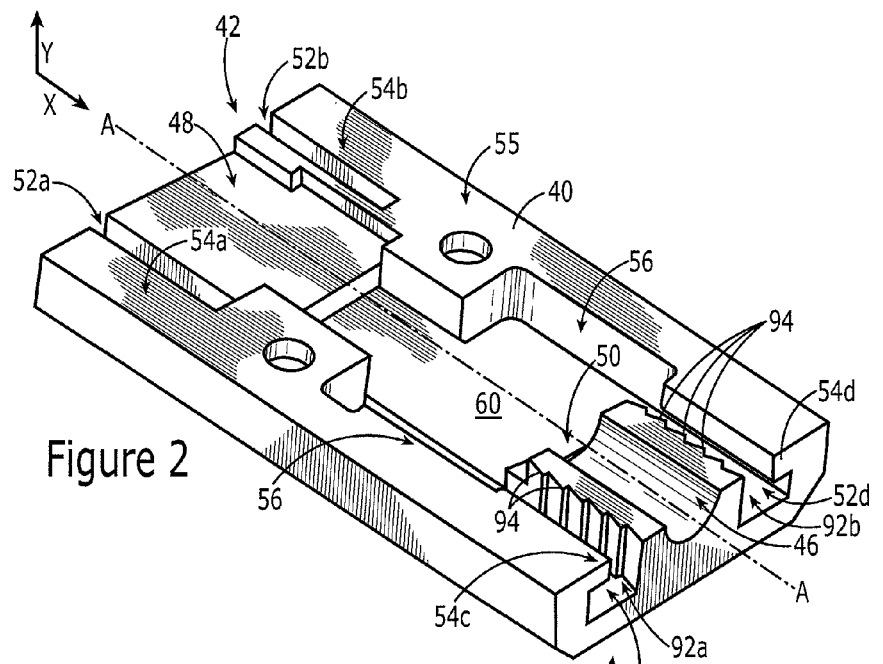
FIG. 2 is an isometric view of a lower housing of an exemplary connector body in accordance with a first embodiment of the present invention.
Figure 3:
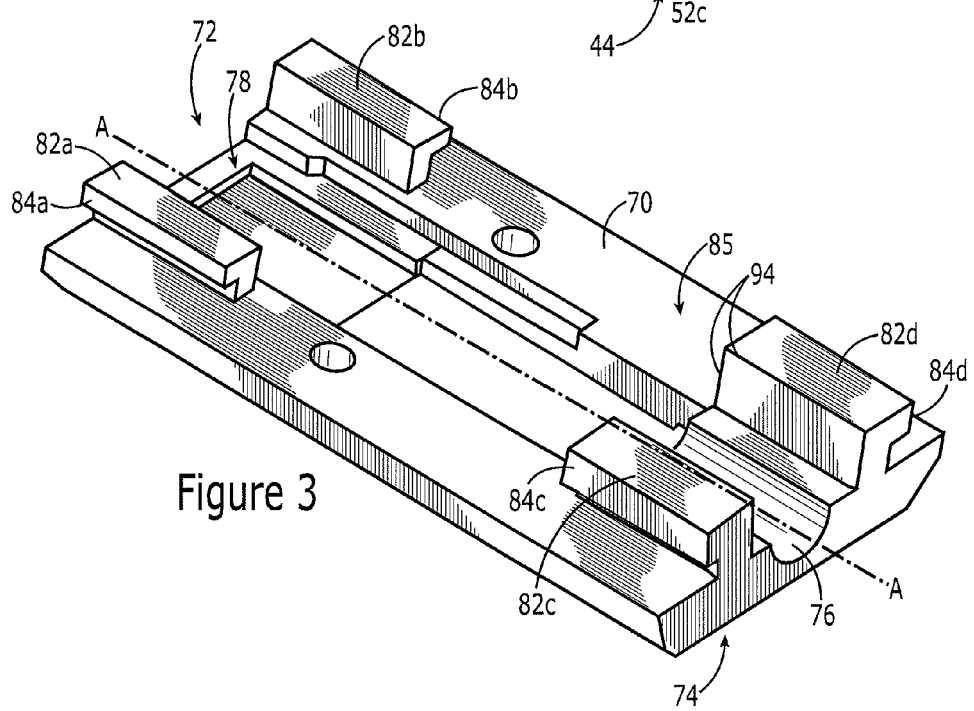
FIG. 3 is an isometric view of an exemplary upper housing configured to mate with the lower housing if FIG. 2.

A first embodiment of an exemplary connector body 100 is described herein with reference to FIGS. 2 and 3. The connector body 100 is composed of complementary housings 40, 70 that may be assembled to form the connector body 100. FIGS. 2 and 3 show isometric views of a lower housing 40 and an upper housing 70 of the connector body 100.

Referring now to FIG. 2, the lower housing 40 has a front end 42, a back end 44, and defines a passage 60 that extends therebetween along a central axis A-A. The passage 60 is configured to hold optical fibers or cables used for transmitting signals in fiber-optic communication applications. The lower housing 40 defines a cable channel portion 46 adjacent its back end 44 that is configured for receiving a cable, and a port portion 48 adjacent its front end 42 that is configured for receiving a ferrule (not shown). In this embodiment, the lower housing 40 further includes a stop 50 positioned adjacent the channel portion 46 and obstructing at least a portion of the channel 46 for abutting a jacket of a cable inserted in the channel, to stop further forward motion of the cable/jacket into the passage 60.

The lower housing 40 further defines locking structures usable to interlock the lower housing 40 with the upper housing 70 to form the connector body 100. As used herein, the terms "interlock" or "interlocked", when used with reference to two parts or components that are directly engaged or coupled to each other, means that the two components are coupled in such a way that the motion or movement of one component is restricted by the other coupled component. As such, interlocked components may allow some movement, but the range of movement is in some way limited by the other component. However, in other embodiments, when the connector is fully assembled the components of the connector are affixed in stationary positions as if the connector was integrally formed. The components would not be able to move unless disengaged from the other component(s). For example, the housings may be handheld and manipulated into the interlocked position by an operator's hand, or the housings may be manipulated into the interlocked position by a machine/tooling as part of an automated assembly process.

Any suitable locking structures may be defined and used. In the exemplary embodiment of FIGS. 2 and 3, the locking structures include a set of reentrant channels 52a, 52b, 52c, 52d extending inwardly (transversely to central axis A-A) from an upper surface 55 of the lower housing 40. Each reentrant channel has a cross-section that is relatively smaller adjacent the upper surface, and relatively larger inwardly from the upper surface, so as to prevent structures of the upper housing from exiting the channel in a direction transverse to the central axis, and thus to interlock the upper and lower housings as described in greater detail below. In the exemplary embodiment of FIGS. 2 and 3, each of the reentrant channels has a generally L-shaped cross-section, and thus the housing includes a shoulder 54a, 54b, 54c, 54d serving to prevent relative motion of the upper and lower housings in the transverse direction, and thus to interlock the housings. These exemplary channels have a substantially uniform cross-section along their lengths (along the central axis A-A) to permit translational motion (along the central axis A-A) of the upper housing relative to the lower housing during the assembly process.

The lower housing 40 further defines a pair of guide channels 56 in communication with a respective pair 52c, 52d of the reentrant channels. These guide channels 56 are dimensioned to permit relative motion of the upper and lower housings in the transverse direction, e.g., during the assembly process, during mating of the upper and lower housings into a mated position, as described below. Thus, the guide channels 56 are sized and shaped to receive complementary locking structures of the upper housing.

Optionally, the lower housing may further include a cantilevered beam displaceable along the central axis A-A for biasing of the ferrule toward an optical reference plane. Such a beam is not shown in FIG. 2, but it is shown and discussed below with reference to the alternative embodiment of FIGS. 4 and 5.

Referring now to FIG. 3, the upper housing 70 is formed to be complementary to the lower housing 40. The upper housing has a front end 72, a back end 74, and defines a passage 90 that extends therebetween along a central axis A-A. The passage 90 is configured to hold optical fibers or cables used for transmitting signals in fiber-optic communication applications. The lower housing 70 defines a channel portion 76 adjacent its back end 74 that is configured for receiving a cable, and a port portion 78 adjacent its front end 72 that is configured for receiving a ferrule (not shown).

The upper housing 70 further defines locking structures usable to interlock the upper housing 70 with the lower housing 40 to form the connector body 100. The locking structures of the upper housing are complementary to those of the lower housing. In the exemplary embodiment of FIGS. 2 and 3, the locking structures include a set of projections 82a, 82b, 82c, 82d extending outwardly (transversely to central axis A-A) from a lower surface 85 of the upper housing 70 (the upper housing 70 being shown upside-down in FIG. 3 for illustrative clarity). Each projection has a cross-section that is relatively larger further from the lower surface 85, and relatively smaller nearer the lower surface 85, so as to prevent the projections from exiting the complementary channels of the lower housing in a direction transverse to the central axis (in the y-direction shown in FIG. 2), and thus to interlock the upper and lower housings as described in greater detail below. In the exemplary embodiment of FIGS. 2 and 3, each of the projections has a generally L-shaped cross-section, and thus each projection includes a shoulder 84a, 84b, 84c, 84d serving to prevent relative motion of the upper and lower housings in the transverse (y-) direction, and thus to interlock the housings (in the y-direction). These exemplary projections have a substantially uniform cross-section along their lengths (along the central axis A-A) to permit translational motion (along the central axis A-A, in the x-direction) of the projections 82a, 82b, 82c, 82d relative to the channels 52a, 52b, 52c, 52d during the assembly process.

Referring again to FIG. 2, the lower housing 40 further defines one or more retention channels for receiving and retaining the strength members of the optical cable. The retention channels are positioned adjacent, e.g., parallel to, the cable channel portion 46. In this manner, strength members exiting the cable (after trimming the jacket) can be easily routed into the retention channels. In the exemplary embodiment of FIG. 2, reentrant channels 52c, 52d serve not only as locking structures for interlocking the upper and lower housings, but also as the retention channels 92a, 92b, though this need not always be the case as discussed below with the embodiment of FIGS. 4 and 5. The retention channels 92a, 92b of the lower housing are dimensioned or otherwise configured to mate with complementary structures of the upper housing in an interference fit, and to thereby pinch and retain the strength members between the upper and lower housings, and thus to secure the strength members to the connector body 100.

In the exemplary embodiment of FIGS. 2 and 3, the housings further define complementary ribs and grooves 94 for registering with one another to pinch and secure the strength members therebetween. In the exemplary embodiment, the ribs are provided on the lower housing 40, and in the form of ramps that will tend to permit relative motion of the housings in only one direction along the central axis AA, as best shown in FIG. 2.

As discussed in greater detail below, the lower and upper housings 40, 70 may be assembled to form the connector body 100. When assembled, the channel portions 46, 76 cooperate to form a channel for receiving an optical fiber cable/jacket, and the port portions 48, 78 cooperate to form a port for receiving and retaining a ferrule. Further, when assembled, the projections and reentrant channels engage one another to interlock the upper and lower housings into a single unitary connector body. As used herein, the term "unitary" means that each component is directly coupled to the other component in such a way that the multiple components operate as a single unit. Further, the projections engage and form an interference fit with the housing in the retention channels so as to pinch and retain the strength members therebetween, as discussed below.

An alternative embodiment of an exemplary connector body 100 is described herein with reference to FIGS. 4-7. This embodiment is similar to that of FIGS. 2 and 3, and thus the connector body 100 is composed of complementary housings 40, 70 that may be assembled to form the connector body 100. However, in this embodiment, the retention structures are separate from the locking structures and have different forms. For illustrative purposes, in this embodiment the lower housing further includes a cantilevered beam for biasing purposes, and projections in the channel portions for retaining a cable's jacket.

Figure 4:
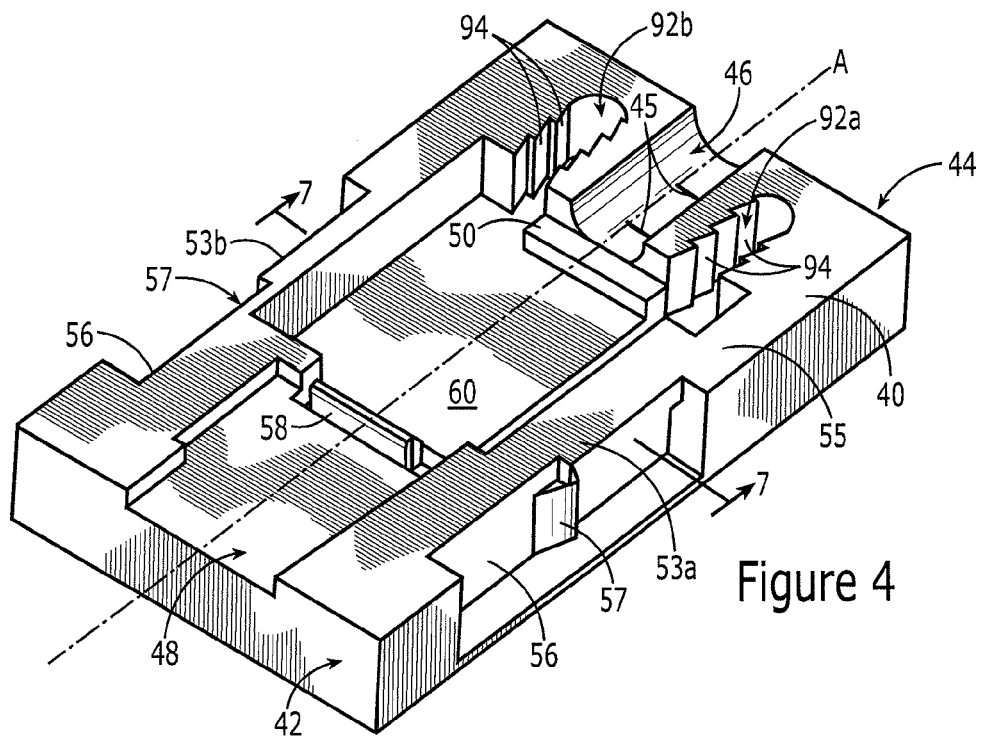
FIG. 4 is an isometric view of a lower housing of an exemplary connector body in accordance with a second embodiment of the present invention.

Referring now to FIG. 4, the lower housing 40 has a front end 42, a back end 44, and defines a passage 60 that extends therebetween along a central axis A-A. The passage 60 is configured to hold optical fibers or cables used for transmitting signals in fiber-optic communication applications. The lower housing 40 defines a cable channel portion 46 adjacent its back end 44 that is configured for receiving a cable, and a port portion 48 adjacent its front end 42 that is configured for receiving a ferrule (not shown). In this embodiment, the lower housing 40 further includes a stop 50 positioned adjacent the channel portion 46 and obstructing at least a portion of the channel 46 for abutting a cable inserted in the channel, to stop further forward motion of the cable/jacket into the passage 60.

In this exemplary embodiment, the housing defines raised protrusions 45 in the channel 46, which are shown generally perpendicular to axis A-A in FIG. 4. These protrusions cause a concentrated pinch point when the two housings are assembled, causing the cable's jacket to take their form and aiding in retaining the jacket in the channel defined by the channel portions of the upper and lower housings. Since the cable's jacket moves independent of the strength members, these protrusions 45 facilitate jacket retention, but not necessarily strength member retention.

The lower housing 40 further defines locking structures usable to interlock the lower housing 40 with the upper housing 70 (FIG. 5) to form the connector body 100. Any suitable locking structures may be defined and used. In the exemplary embodiment of FIGS. 4 and 5, the locking structures include a set of shoulders 53a, 53b elongated in the direction of central axis A-A adjacent an upper surface 55 of the lower housing 40, as will be appreciated from FIGS. 4 and 6. Each shoulder extends transversely to the central axis A-A to retain complementary structures of the upper housing and resist motion of the complementary structures in a direction transverse to the central axis (normal to the upper surface 55), and thus to interlock the upper and lower housings as described in greater detail below. These exemplary shoulders have a substantially uniform cross-section along their lengths (along the central axis A-A) to permit translational motion (along the central axis A-A) of the upper housing relative to the lower housing during the assembly process.

The lower housing 40 further defines a pair of guide channels 56 dimensioned to permit relative motion of the upper and lower housings in the transverse direction (normal to the upper surface 55), e.g., during the assembly process, during mating of the upper and lower housings into a mated position, as described below. Thus, the guide channels 56 are sized and shaped to receive complementary locking structures of the upper housing. Further, in this embodiment, the guide channels 56 include a pair of ramps 57 for spreading and then retaining locking structures of the upper housing, as discussed below.

In this exemplary embodiment, the lower housing 40 further includes a cantilevered beam 58 for biasing of the ferrule toward an optical reference plane (e.g. in opposition to displacement of a ferrule toward the rear of the housing 40 during mating of the connector body with another connector body).

Figure 5:
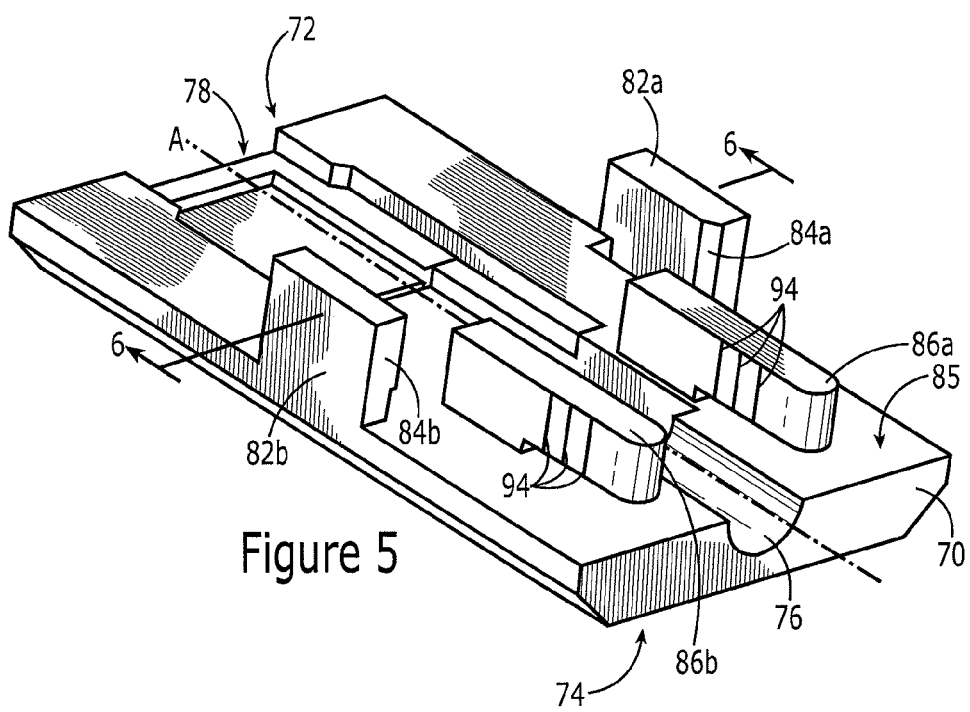
FIG. 5 is an isometric view of an exemplary upper housing configured to mate with the lower housing if FIG. 4.
Figure 6:
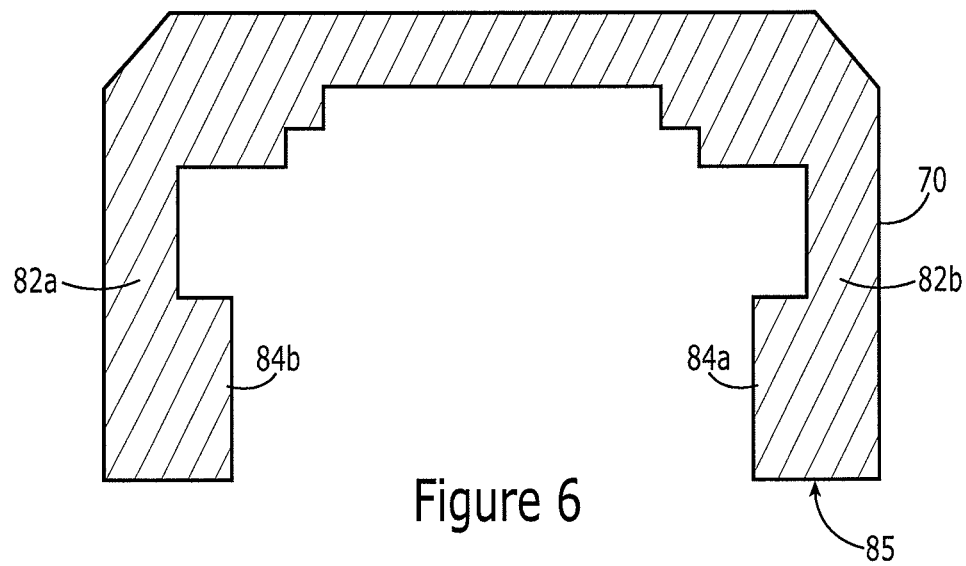
FIG. 6 is a cross-sectional view of the upper housing of FIG. 5 taken along line 6-6 of FIG. 5, and shown inverted relative to FIG. 5 for illustrative purposes.
Figure 7:
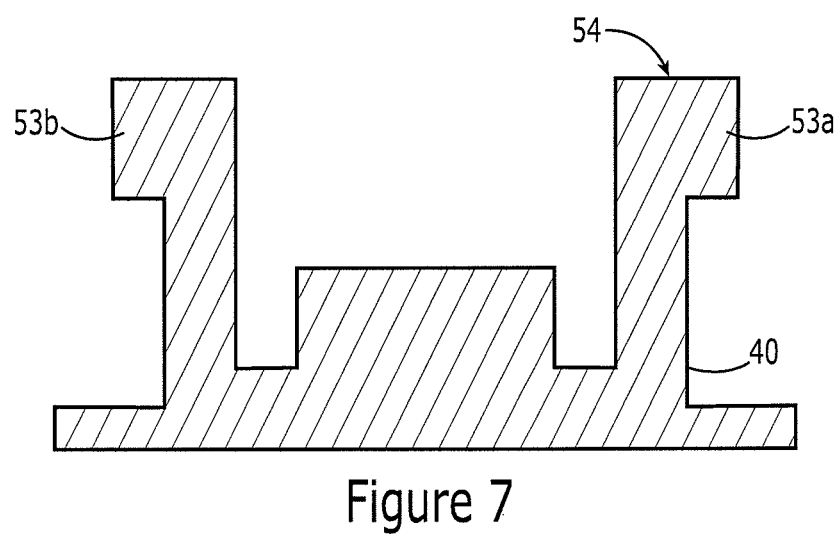
FIG. 7 is a cross-sectional view of the lower housing of FIG. 4 taken along line 7-7 of FIG. 6.

Referring now to FIG. 5, the upper housing 70 is formed to be complementary to the lower housing 40. The upper housing has a front end 72, a back end 74, and defines a passage 90 that extends therebetween along a central axis A-A. The passage 90 is configured to hold optical fibers or cables used for transmitting signals in fiber-optic communication applications. The lower housing 70 defines a channel portion 76 adjacent its back end 74 that is configured for receiving a cable, and a port portion 78 adjacent its front end 72 that is configured for receiving a ferrule (not shown).

The upper housing 70 further defines locking structures usable to interlock the upper housing 70 with the lower housing 40 to form the connector body 100. The locking structures of the upper housing are complementary to those of the lower housing. In the exemplary embodiment of FIGS. 2 and 3, the locking structures include a set of projections 82a, 82b extending outwardly (transversely to central axis A-A) from a lower surface 85 of the upper housing 70 (the upper housing 70 being shown upside-down in FIG. 5 for illustrative clarity). Each projection has a cross-section that is relatively larger further from the lower surface 85, and relatively smaller nearer the lower surface, so as to prevent the projections from exiting the complementary channels of the lower housing in a direction transverse to the central axis (the y-direction), and thus to interlock the upper and lower housings as described in greater detail below. In the exemplary embodiment of FIGS. 2 and 3, each of the projections has a generally L-shaped cross-section, and thus each projection includes a shoulder 84a, 84b serving to abut the shoulders 53a, 53b of the lower housing and prevent relative motion of the upper and lower housings in the transverse direction, and thus to interlock the housings, as will be appreciated from FIGS. 6 and 7. These exemplary projections have a substantially uniform cross-section along their lengths (along the central axis A-A) to permit translational motion (along the central axis A-A) of the projections 82a, 82b relative to the shoulders channels 53a, 53b during the assembly process.

Referring again to FIG. 4, the lower housing 40 further includes one or more retention channels for receiving and retaining the strength members of the optical cable. The retention channels are positioned adjacent, e.g., parallel to, the cable channel portion 46. In this manner, strength members exiting the cable can be easily routed into the retention channels. The upper housing 70 further includes retention structures 86a, 86b extending in the direction of the central axis, as shown in FIG. 5. The retention channels 92a, 92b of the lower housing and the retention structures 86a, 86b are dimensioned to mate in an interference fit, and to thereby pinch and retain the strength members therebetween, and thus to secure the strength members to the connector body 100.

In the exemplary embodiment of FIGS. 4 and 5, the housings further define complementary ribs and grooves 94 for registering with one another to pinch and secure the strength members therebetween. In the exemplary embodiment, the ribs are provided on the lower housing, and in the form of ramps that will tend to permit relative motion of the housings in only one direction along the central axis AA, as best shown in FIG. 2. It should be noted that in this embodiment, the retention structures and retention channels are not configured to resist separation of the upper and lower housing in a direction transverse to the central axis (e.g., the y-direction, generally normal to surface 55). Instead, the channels 53a, 53b and projections 82a, 82b are alone relied upon to oppose such separation in this embodiment.

As discussed in greater detail below, the lower and upper housings 40, 70 are assembled to form the connector body 100. When assembled, the channel portions 46, 76 cooperate to form a channel for receiving an optical fiber cable/jacket, and the port portions 48, 78 cooperate to form a port for receiving and retaining a ferrule (as best shown in FIGS. 8-12). Further, when assembled, the shoulders engage one another to interlock the upper and lower housings into a single unitary connector body.

Figure 8:
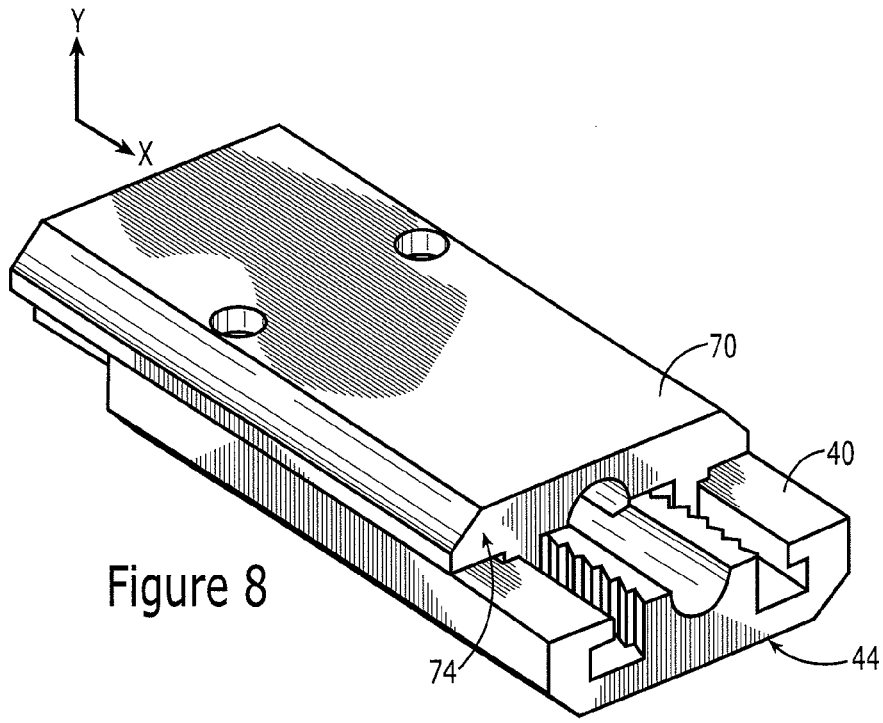
FIG. 8 shows the upper and lower housings of FIGS. 2 and 3 in a mated position.
Figure 9:
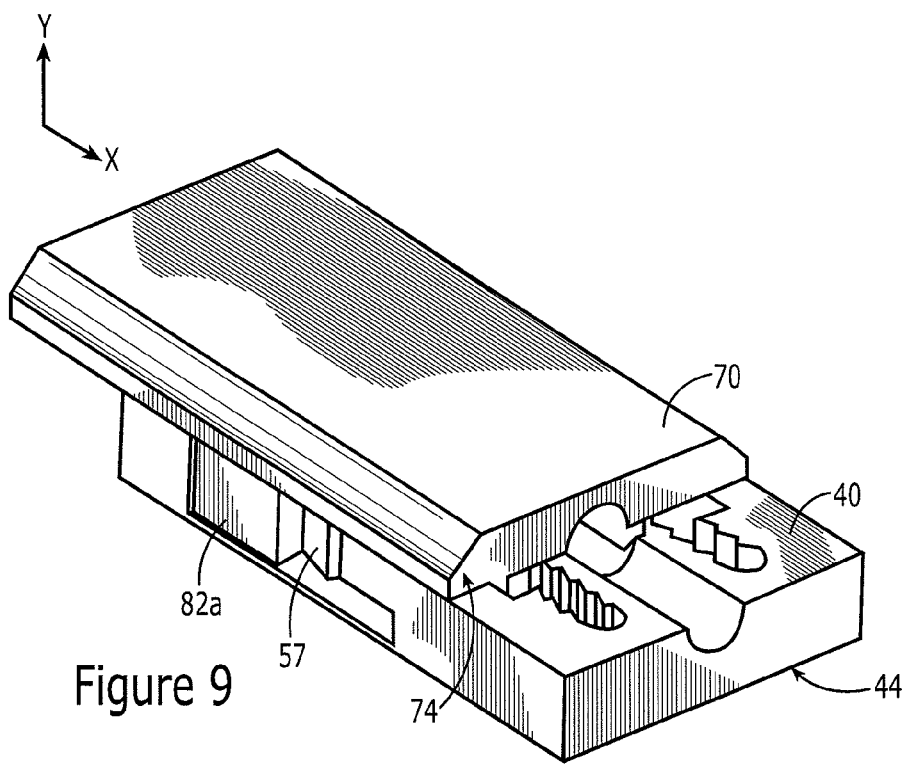
FIG. 9 shows the upper and lower housings of FIGS. 4-7 in a mated position.

Assembly of the upper and lower housings to interlock the housings and provide a unitary connector body 100 involves two steps, involving manipulation of the housings in two distinct motions. In a first step, the upper housing 70 is moved into a mated position with the lower housing 40. FIG. 8 shows the upper and lower housings of FIGS. 2 and 3 in a mated position. FIG. 9 shows the upper and lower housings of FIGS. 4-7 in a mated position. In the mated position, the upper and lower housings abut one another, but are not yet in a fully-assembled (interlocked) position in which the housings are interlocked. With respect to the exemplary embodiments of FIGS. 2-7, this involves aligning the upper and lower housings so that the locking structures on one housing will freely enter the complementary structures on the other housing. For example, with reference to FIGS. 2 and 3, this involves aligning the upper and lower housings until the locking projections 82a, 82b are positioned beyond a footprint of the lower housing, and the locking projections 82c, 82d are aligned with the guide channels 56. At this point, the upper housing 70 is moved (e.g., in the y-direction of FIG. 8) until the locking projections 82c, 82d enter the guide channels, and all locking projections 82a, 82b, 82c, 82d are aligned for motion in the direction of the central axis A-A. At this point, the housings are in a mated position, as shown in FIG. 8.

Next, the upper and/or lower housings are translated relative to one another along central axis A-A (e.g., in the x-direction of FIG. 8). In the example of FIG. 8, this involves moving the upper housing 70 to the lower-right of the figure until the back ends 44, 74 are substantially coplanar. This causes the shoulders 84a, 84b, 84c, 84d of the projections to mate with the reentrant channels 52a, 52b, 52c, 52d, so that the housings 40, 70 are interlocked, in that the housings cannot be separated from one another by motion in a direction transverse to the central axis (e.g., in the y-direction of FIG. 8, and preferably also in the x-direction).

With respect to the exemplary embodiments of FIGS. 4-7 and 9, assembly of the connector body 100 involves aligning the upper and lower housings so that the locking structures on one housing will freely enter the complementary structures on the other housing. For example, with reference to FIGS. 4 and 5, this involves aligning the upper and lower housings until the locking projections 82a, 82b are positioned in alignment with the guide channels 56. At this point, the upper housing 70 is moved (e.g., in the y-direction of FIG. 9) until the locking projections 82a, 82b enter the guide channels, and the shoulders 84a, 84b are aligned for motion in the direction of the central axis A-A (e.g., in the x-direction of FIG. 9). At this point, the housings are in a mated position, as shown in FIG. 9.

Next, the upper and/or lower housings are translated relative to one another along central axis A-A (e.g., in the x-direction of FIG. 9). In the example of FIG. 9, this involves moving the upper housing 70 to the lower-right of the figure until the back ends 44, 74 are substantially coplanar. This causes the projections 82a, 82b to ride over ramps 57 until the shoulders 84a, 84b of the projections 82a 82b of the upper housing 70 mate with and lie beneath the corresponding shoulders 53a, 53b of the lower housing 40 so that the housings 40, 70 are interlocked, in that the housings cannot be separated from one another by motion in a direction transverse to the central axis (e.g., in the y-direction of FIG. 9, and preferably also in the x-direction). In this exemplary embodiment, ramps 57 resist or prevent subsequent movement of the housings out of the interlocked position toward the mated position.

Figure 10:
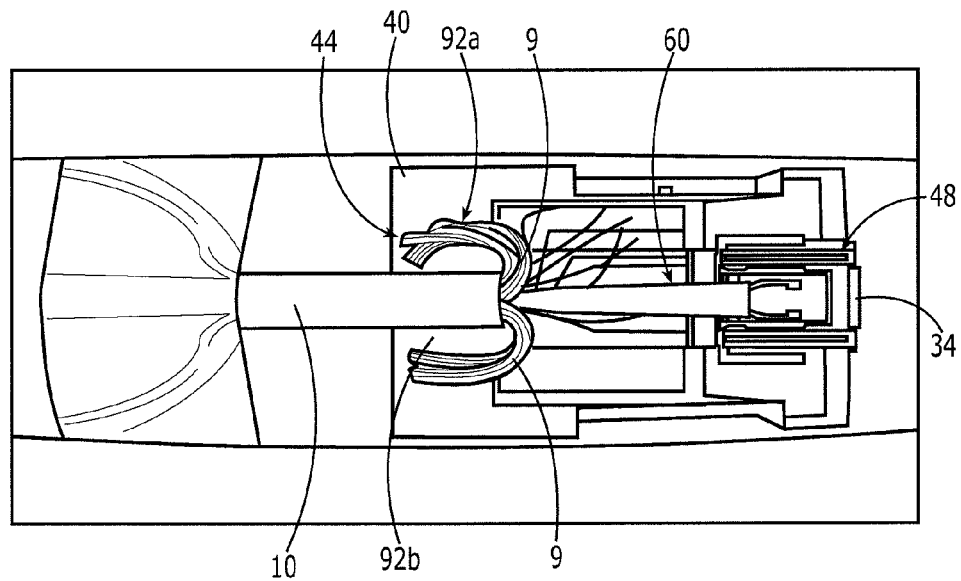
FIG. 10 shows a fiber optic cable positioned on the lower housing of FIG. 4.

For illustrative purposes, assembly of the connector housings of FIGS. 4 and 5 and a fiber optic cable, to provide a connector assembly, is described below with reference to FIGS. 10-12. In use, the connector housings may be used as follows. First, a fiber optic cable 10 may be prepared and terminated to a ferrule 34, before any assembly of the connector components, and without threading any connector components onto the cable. Next, the lower housing 40 can be positioned on a work surface. The terminated fiber optic cable can then be positioned in the passage 60 of the lower housing 40, by placing the jacketed fiber 10 in the cable channel portion 46 of the housing, with the jacket abutting the stop 50. The strength members 9 may then be placed in the retention channels 92a, 92b, e.g., by directing them backwardly toward the back end 44 of the housing. The buffered fibers may then be placed in a central portion of the passage 60, and the ferrule 34 may be placed in the port portion 48 of the housing 40. The port portion 48 is preferably contoured and/or dimensioned to mate with and receive and retain a complementarily shaped ferrule.

Next, the upper housing 70 is positioned adjacent the lower housing 40, with the housings aligned so that the locking structures on one housing will freely enter the complementary structures on the other housing, e.g. so that the upper housing's locking projections 82a, 82b are positioned directly above the guide channels 56 of the lower housing. At this point, the upper housing 70 is moved toward the lower housing until the locking projections 82a, 82b enter the guide channels, and the shoulders 84a, 84b are aligned for motion in the direction of the central axis A-A. At this point, the housings are in a mated position, as shown in FIG. 11.

Figure 11:
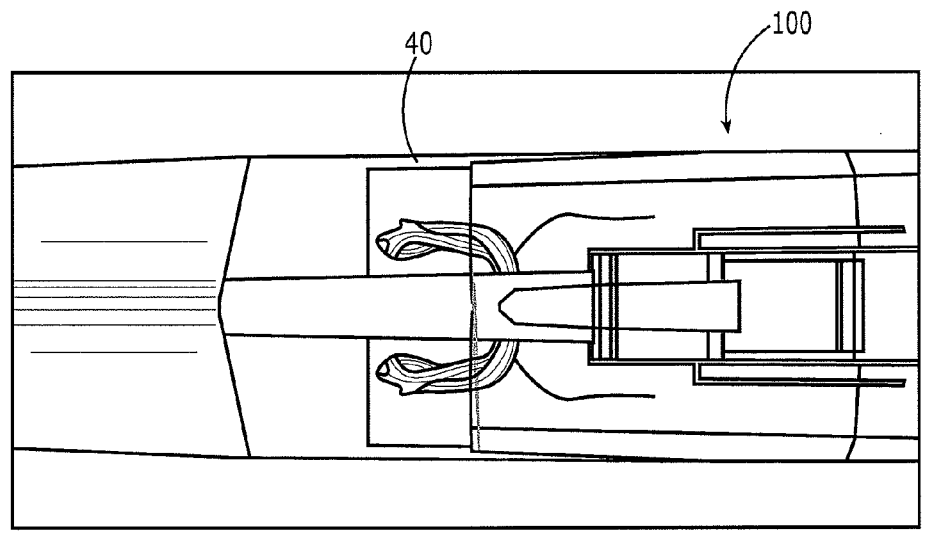
FIG. 11 shows the upper housing of FIG. 5 in a mated position relative to the fiber optic cable and lower housing if FIG. 10.
Figure 12:
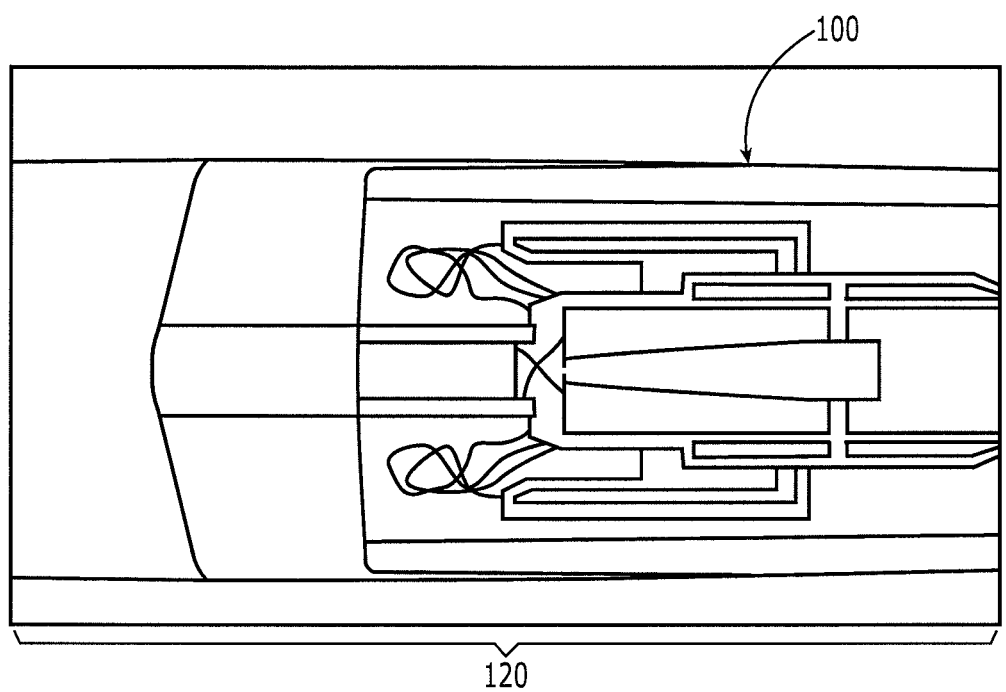
FIG. 12 shows an assembled connector body including the upper housing of FIG. 5 in an interlocked position with the fiber optic cable and lower housing of FIG. 10.

Next, the upper and/or lower housings are translated relative to one another along central axis A-A (e.g., by moving the upper housing 70 to the left in FIGS. 11 and 12). This causes the projections 82a, 82b to ride over ramps 57 until the shoulders 84a, 84b of the projections 82a 82b of the upper housing 70 mate with and lie beneath the corresponding shoulders 53a, 53b of the lower housing 40 so that the housings 40, 70 are interlocked, in that the housings cannot be separated from one another by motion in a direction transverse to the central axis. At this point, the housings are in the interlocked position, and the connector body 100, and a corresponding cable assembly 120, has been formed, as shown in FIG. 12.

It will be appreciated that the translational movement causing the upper and lower housings to interlock also causes the retaining projections 86a, 86b to enter the retention channels 92a, 92b, and to thereby push and/or smooth the strength members rearwardly (toward the back end 44 of the lower housing 40) while forming an interference fit therebetween, and pinch and retaining the strength members 9 therebetween. As a result of the interlocking movement, the strength members are pinched between the retaining projections and housing in the retaining channel, and are pulled toward the back end 44 of the housing. This tends to draw the cable jacket 10 tightly against the stop 50, to remove any slack from the strength members, and/or to place the strength members in tension. In this manner, the strength members 9 are secured to the connector body 100.

While the present invention has been particularly shown and described with reference to the preferred mode as illustrated in the drawing, it will be understood by one skilled in the art that various changes in detail may be effected therein without departing from the spirit and scope of the invention as defined by the claims.

What is claimed is:

1. A connector body for making crimp-less connections for a fiber optic cable comprising strength members, the connector body defined along a longitudinal axis extending in an orientation corresponding to the orientation of the fiber optic cable strength members, and a second axis extending along an orientation different to the longitudinal axis, the connector body comprising:
- a lower housing defining:
  - a locking structure; and
  - at least one retention channel for receiving strength members; the at least one retention channel defined along the longitudinal axis; and
- an upper housing defining:
  - a complementary structure complementary to said locking structure of said lower housing, the complementary structure being disposed to register with the locking structure to interlock the upper housing to the lower housing when the upper and lower housings are in an interlocked position; and
  - at least one retention projection disposed to register with the at least one retention channel when the upper and lower housings are in the interlocked position with the longitudinal axis extending therethrough, said locking structure and said complementary structure being configured to interlock the upper and lower housings by translating one of the housings relative to the other along the longitudinal axis, and when interlocked, the upper and lower housings cannot be separated from each other along the second axis.

2. The connector body of claim 1, wherein said at least one retention projection is configured to form an interference fit with said at least one retention channel, and to thereby pinch any strength members positioned therebetween.

3. The connector body of claim 1, said lower housing having a front end and a back end and defining a passage therebetween, the lower housing further defining:
- a cable channel portion adjacent its back end;
- a port portion adjacent its front end.

4. The connector body of claim 3, said upper housing having a respective front end and back end, and defining a respective passage therebetween, the upper housing further defining:
- a respective cable channel portion adjacent its back end;
- a respective port portion adjacent its front end;
- wherein, when said upper and lower housings are in the interlocked position, said cable channel portions cooperate to provide a channel for receiving a cable, and wherein said port portions cooperate to provide a port for receiving a ferrule.

5. The connector body of claim 1, said at least one retention channel comprises a pair of retention channels.

6. The connector body of claim 5, wherein a cable channel portion extends along an axis, and wherein each of said pair of retention channel is extends substantially parallel to said axis.

7. The connector body of claim 1, further comprising a stop positioned adjacent to a cable channel portion.

8. The connector body of claim 1, wherein said locking structure comprises a plurality of channels, and wherein said complementary structure comprises a plurality of projections configured to mate with said plurality of channels.

9. The connector body of claim 8, wherein each of said plurality of channels is a reentrant channel smaller at a surface of the lower housing than at a point internal to the lower housing.

10. The connector body of claim 9, wherein each of the channels a generally L-shaped cross-section, and wherein each of said plurality of projections has a complementary generally L-shaped cross-section.

11. The connector body of claim 1, wherein one of said at least one retention channel and said at least one retention projection comprises one of a rib and a complementary groove, and the other of said at least one retention channel and said at least one retention projection comprises the other of the rib and the complementary groove.

12. The connector body of claim 11, where at least one rib is formed as a ramp limiting relative movement of the housings.

13. The connector body of claim 1, said lower housing further comprising a pair of guide channels, the guide channels permitting relative movement of said upper and lower housings in a first direction into a mated position, said locking structure and complementary structure permitting relative movement of said upper and lower housings in a second direction transverse to said first direction from the mated position into the interlocked position.

14. The connector body of claim 1, said lower housing further comprising a cantilevered beam extending from said lower housing for biasing a ferrule toward an optical reference plane.

15. A connector body for making crimp-less connections for a fiber optic cable comprising strength members, the connector body defined along a longitudinal axis extending in an orientation corresponding to the orientation of the fiber optic cable strength members, and a second axis extending along an orientation different to the longitudinal axis, the connector body comprising:
- a lower housing defining:
  - a locking structure; and
  - at least one retention channel for receiving strength members; the at least one retention channel defined along the longitudinal axis; and
- an upper housing defining:
  - a complementary structure complementary to said locking structure of said lower housing, the complementary structure being disposed to register with the locking structure to interlock the upper housing to the lower housing when the upper and lower housings are in an interlocked position; and
at least one retention projection disposed to register with the at least one retention channel when the upper and lower housings are in the interlocked position with the longitudinal axis extending therethrough, said locking structure and said complementary structure being configured to interlock the upper and lower housings by translating one of the housing relative to the other along the longitudinal axis, and when interlocked, the upper and lower housings cannot be separated from each other along the second axiswherein each locking structure comprises a shoulder extending between said first and second end of the lower housing, and wherein each complementary structure comprises a projection having a complementary shoulder, said lower housing further comprising a pair of guide channels, the guide channels permitting relative movement of said upper and lower housings in a first direction, said locking structure and complementary structure permitting relative movement of said upper and lower housings in a second direction transverse to said first direction, said lower housing further comprising at least one ramp disposed adjacent at least one of the pair of guide channels for spreading the projection and retaining the complementary shoulders of the upper housing in an interlocking position with the shoulders of the lower housing.

16. A cable connector assembly comprising a connector body for making crimp-less connections for a fiber optic cable comprising strength members, the cable connector assembly comprising:
- a connector body comprising:
  - a lower housing having a front end and a back end, and defining a passage therebetween, the lower housing being configured to define:
    - a cable channel portion adjacent its back end;
    - at least one retention channel adjacent the cable channel for receiving strength members; and
    - a locking structure; and
  - an upper housing having a respective front end and back end, and defining a respective passage therebetween, the upper housing being configured to define:
    - a complementary structure complementary to said locking structure of said lower housing for interlocking the upper housing to the lower housing when the upper and lower housings are in an interlocked position; and
    - at least one retention projection disposed to register with the at least one retention channel when the upper and lower housings are in the interlocked position; and
- a terminated fiber optic cable comprising a jacket housing a buffered optical fiber and a plurality of strength members, the fiber optic cable comprising at least one optical fiber terminated to a ferrule;
- the upper and lower housings being in an interlocked position in which the locking structure is interlocked with the complementary locking structure, the ferrule being supported between the upper and lower housings of the connector body, the at least one retention projection being in registration with the at least one retention channel and pinching the strength members therebetween.

17. A method for making a crimp-less connection for a fiber optic cable comprising strength members, the method comprising:
- providing a connector body comprising:
  - a lower housing having a front end and a back end, and defining a passage therebetween, the lower housing being configured to define:
    - a cable channel portion adjacent its back end;
    - at least one retention channel adjacent the cable channel for receiving strength members;
    - a locking structure;
    - a guide channel adjacent the locking structure; and
  - an upper housing having a respective front end and back end, and defining a respective passage therebetween, the upper housing being configured to define:
    - a complementary structure complementary to said locking structure of said lower housing for interlocking the upper housing to the lower housing when the upper and lower housings are in an interlocked position; and
    - at least one retention projection disposed to register with the at least one retention channel when the upper and lower housings are in the interlocked position; and
- providing a terminated fiber optic cable comprising a jacket housing a buffered optical fiber and a plurality of strength members, the fiber optic cable comprising at least one optical fiber terminated to a ferrule;
- positioning the terminated fiber optic cable's jacket in the cable channel portion of the lower housing and the ferrule adjacent the lower housing's front end;
- positioning the plurality of strength members in the at least one retention channel; and
- moving the upper and lower housings into an interlocked position in which the locking structure is interlocked with the complementary locking structure, the ferrule is supported between the upper and lower housings of the connector body, and the at least one retention projection is in registration with the at least one retention channel with the strength members pinched therebetween.

18. The method of claim 17, wherein moving the upper and lower housings into an interlocked position comprises:
- positioning the upper housing adjacent the lower housing with the locking structure and complementary structure in alignment;
- moving the upper and lower housings in a first direction into a mated position in which the complementary structure is in registration with the guide channel; and
- moving at least one of the upper and lower housings in a second direction transverse to the first direction until the upper and lower housings are in the interlocked position.

19. The method of claim 17, wherein positioning the plurality of strength members in the at least one retention channel comprises directing a flow of air from the front toward the rear of the lower housing.

20. The method of claim 17, wherein moving the upper and lower housings into an interlocked position comprises causing the strength members to be pinched between the at least one retention projection and the housing in the at least one retention channel, and to be pulled toward the back end of the lower housing by the engagement of the at least one retention projection with the housing in the at least one retention channel.

* * * * *